Sept. 13, 1932.                L. LAISNE                1,877,332
                              MOTOR VEHICLE
                          Filed Sept. 11, 1928        3 Sheets-Sheet 1
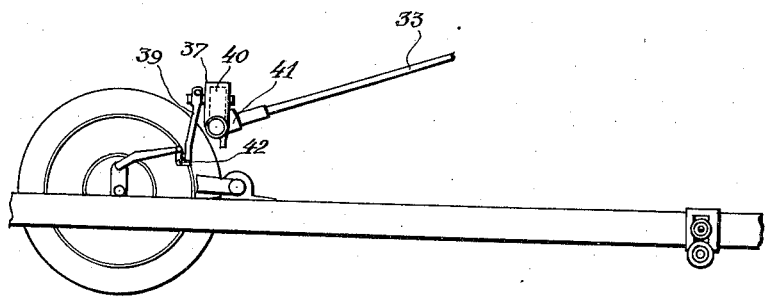
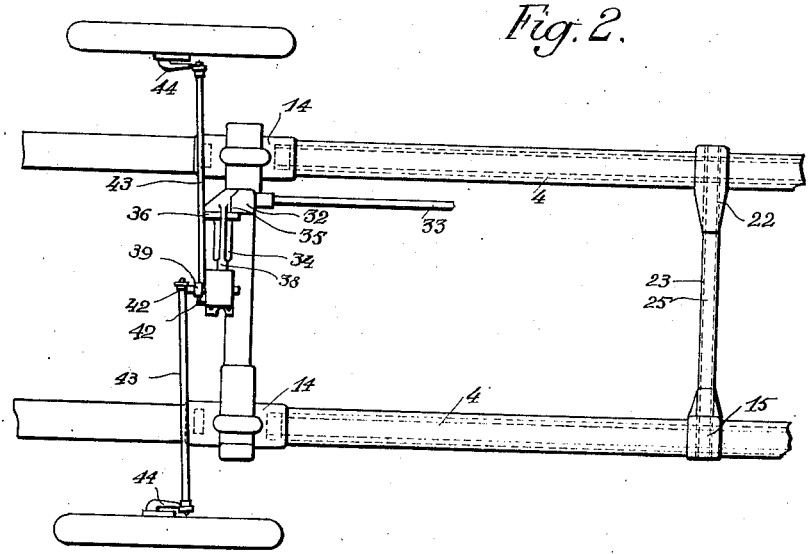
Inventor:
Léon Laisne
By:
Addison G. Armstrong
Attorney.

Sept. 13, 1932.                L. LAISNE                1,877,332
                             MOTOR VEHICLE
                        Filed Sept. 11, 1928       3 Sheets-Sheet 2
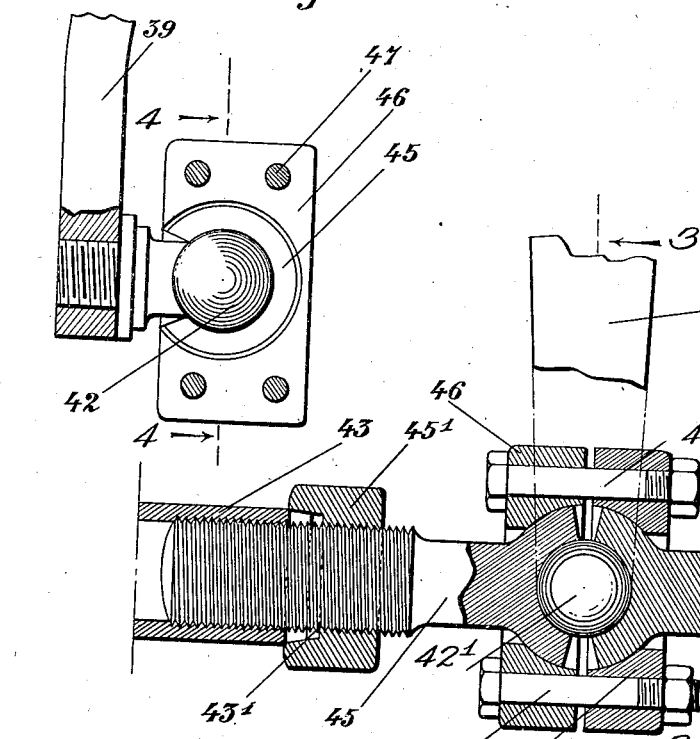
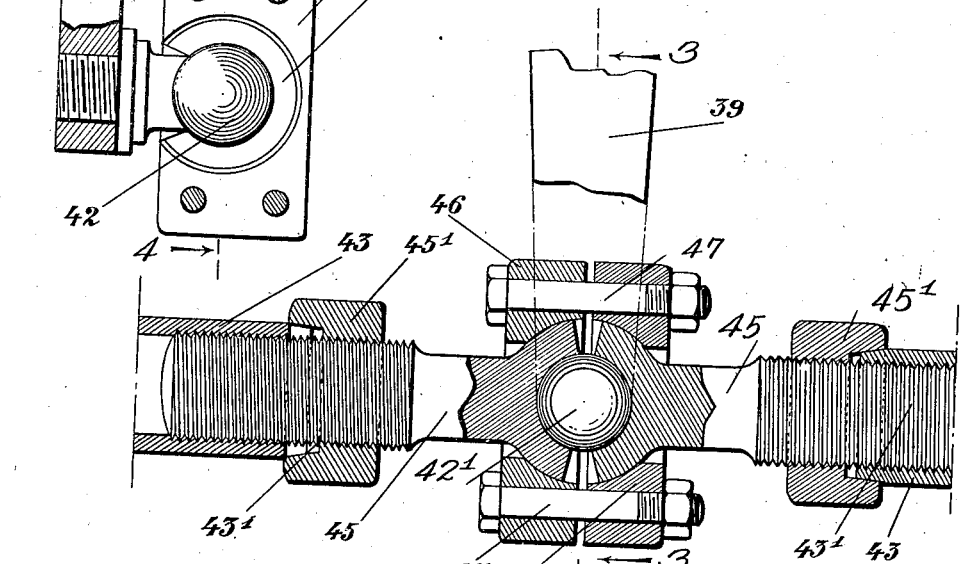
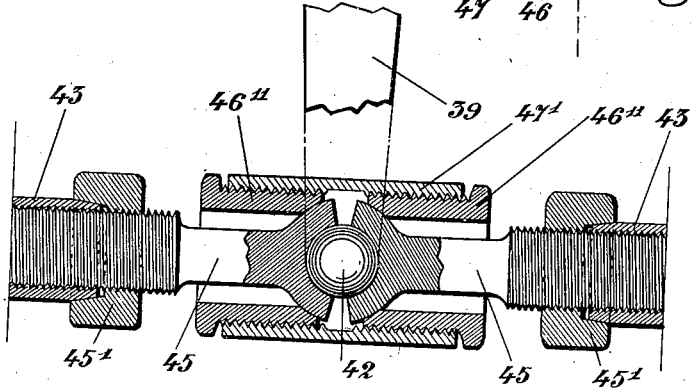

Sept. 13, 1932.  L. LAISNE  1,877,332
MOTOR VEHICLE
Filed Sept. 11, 1928   3 Sheets-Sheet 3
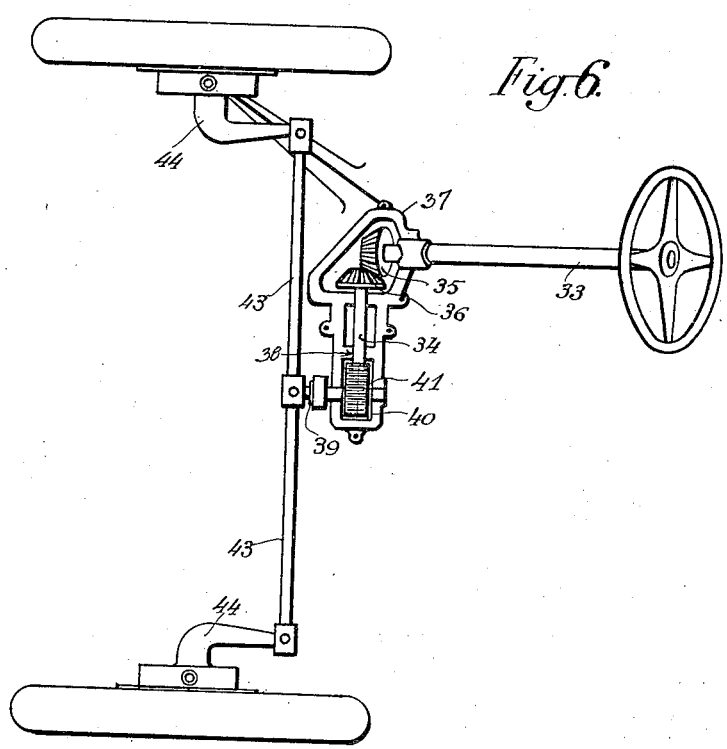
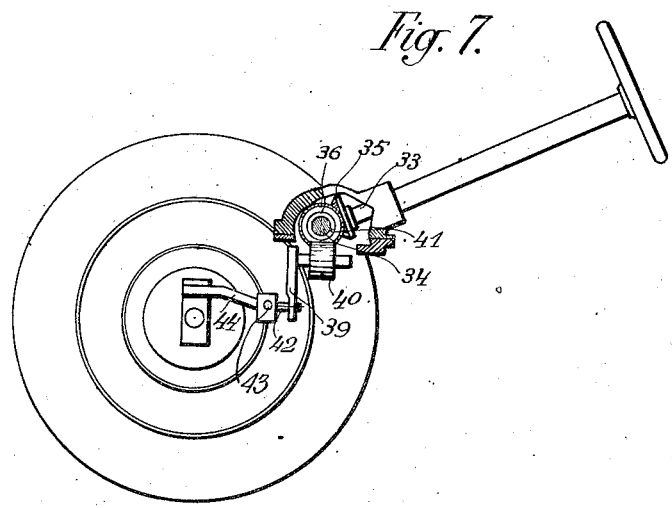

Patented Sept. 13, 1932

1,877,332

UNITED STATES PATENT OFFICE

LEON LAISNE, OF NANTES, FRANCE

MOTOR VEHICLE

Application filed September 11, 1928, Serial No. 305,256, and in Belgium September 19, 1927.

My invention relates to improvements in motor vehicles, and more particularly to a steering gear therefor.

One of the objects of the invention is to provide a vehicle of the type mentioned with an improved steering arrangement in which the wheels are free from reaction upon each other and upon the steering wheel with a view to facilitating steering of the vehicle.

The invention is further comprised in certain novel forms, constructions, and combinations of parts the objects of which are to provide reliable devices for the purposes stated and to cheapen the cost of manufacture.

The invention will be more readily understood by those skilled in the art to which it relates in the following description, when taken in connection with the accompanying drawings forming part of this specification, and in which—

Fig. 1 is a longitudinal section through an automobile chassis provided with my improved steering gear;

Fig. 2 is a plan view of Fig. 1;

Fig. 3 is a modified form of steering detail taken on the line 3—3 of Fig. 4;

Fig. 4 is a section along the line 4—4 of Fig. 3;

Fig. 5 is a sectional detail of a modification of Fig. 4;

Fig. 6 is a plan view of a steering arrangement on an enlarged scale with parts broken away; and Fig. 7 is a section of Fig. 6.

Referring to the drawings and more particularly to Figs. 1, 6 and 7, the steering mechanism is composed of a casing 32 in which is lodged a suitable motion transmitting mechanism consisting of bevelled gears 35 and 36 connected respectively to the steering shaft 33 and a transverse shaft 34. In certain cases I may prefer to substitute helicoidal pinions for the bevelled gears 35 and 36. Casing 32 is joined to a second casing 37 by means of a connecting part 38 through which the shaft 34 extends. Lodged within the casing 37 is a suitable mechanism for transmitting the rotary movement of shaft 34 to the crank 39 in the form of a reciprocating motion. This last mentioned motion transmitting mechanism comprises a worm 41 carried by the shaft 34 meshing with a worm-wheel 40 adapted to drive the operating crank 39.

As shown in Figs. 1 and 2, operating crank 39 is connected to a pair of connecting rods 43 by means of a pair of ball and socket joints 42 and each of said connecting rods drives a steering lever 44 each controlling a wheel.

In Figs. 3 and 4 I have shown a construction in which only a single ball and socket joint is necessary. In this embodiment operating crank 39 is provided with the usual ball 42' upon which pivot two socket members 45 secured respectively to the connecting rods 43 by means of a set of threads 43' for adjusting purposes, the said socket members being secured to their respective rods by means of nuts 45' carried by the sets of threads 43'. The arrangement is such that the socket members and their respective rods lie in the same straight line but such that the socket members may move independently of each other. The members 45 are enclosed by two housing members 46 clamped thereon by means of bolts 47.

Fig. 5 shows a modification of the single ball and socket arrangement of Figs. 3 and 4. In this embodiment the elements 42', 43, 45 and 45' are arranged precisely as in Figs. 3 and 4. The members 46, however, are here in the form of tubes 46" each provided with threads of opposite pitch. Tubes 46" are clamped on the members 45 by means of a sleeve 47' correspondingly tapped to receive the tubes 46". This arrangement is particularly useful for taking up play in the rods 43.

Having thus described my invention what I claim as new and desire to secure by Letters Patent is:

1. In steering mechanism for the chassis of an automobile vehicle means transmitting to the wheels the movement of the governing rod actuated by the steering shaft, comprising two independent connecting bars of adjustable length substantially in extension of one another, and a universal ball joint articulating the inner ends of said bars to the said governing rod which allows liberty of movement in all directions substantially as described.

2. Mechanism as in claim 1 wherein the ball is integral with the actuating rod the connecting bars being constituted at their inner ends by two pieces terminating in the form of semi-spherical cups which embrace the said ball and are connected to the said connecting bars by means of a screw threaded part retained by a nut the cups which terminate the connection bars being pressed against the ball by means of a pair of plates adjusted by bolts substantially as described.

3. Steering mechanism as in claim 1 wherein the ball of the joint is free and the connecting bars are constituted inside by two pieces in the form of spherical cups which embrace the ball these pieces being pressed against the ball by exteriorly screw-threaded tubes of reverse pitch on which is screwed a sleeve tapped in reverse directions at its two ends and which is fixed to the actuating rod and permits of regulating the effective action of the connecting bars substantially as described.

In testimony whereof I hereunto affix my signature.

LEON LAISNE.